United States Patent [19]

Chern et al.

[11] Patent Number: 4,545,646
[45] Date of Patent: Oct. 8, 1985

[54] PROCESS FOR FORMING A GRADED INDEX OPTICAL MATERIAL AND STRUCTURES FORMED THEREBY

[75] Inventors: Mao-Jin Chern, Rancho Palos Verdes; Ronald T. Smith, Redondo Beach; John W. Peters, Malibu, all of Calif.

[73] Assignee: Hughes Aircraft Company, El Segundo, Calif.

[21] Appl. No.: 528,833

[22] Filed: Sep. 2, 1983

[51] Int. Cl.⁴ .................. G02B 5/18; B05D 3/06
[52] U.S. Cl. .................. 350/162.2; 427/53.1; 427/162; 427/167
[58] Field of Search .......... 427/162, 163, 167, 53.1; 350/3.72, 162.16, 413, 162.2

[56] References Cited

U.S. PATENT DOCUMENTS

| | | | |
|---|---|---|---|
| 3,271,179 | 9/1966 | Smith | 427/162 |
| 3,486,808 | 12/1969 | Hamblen | 350/413 |
| 3,808,035 | 4/1974 | Stelter | 427/162 |
| 3,940,204 | 2/1976 | Withrington . | |
| 3,959,548 | 5/1976 | Bernal | 427/162 |
| 4,009,300 | 2/1977 | Chaffin | 427/162 |
| 4,130,672 | 12/1978 | Onoki et al. . | |
| 4,181,751 | 1/1980 | Hall et al. . | |
| 4,206,252 | 6/1980 | Gordon | 427/160 |
| 4,309,075 | 1/1982 | Apfel et al. . | |
| 4,340,617 | 7/1982 | Deutsch et al. | 427/53.1 |
| 4,371,587 | 2/1983 | Peters | 427/53.1 |
| 4,416,217 | 11/1983 | Nakamura . | |
| 4,482,207 | 11/1984 | Thomas | 350/162.2 |

FOREIGN PATENT DOCUMENTS

3112460 9/1982 Fed. Rep. of Germany .
3202709 8/1983 Fed. Rep. of Germany .

Primary Examiner—John H. Newsome
Attorney, Agent, or Firm—Mary E. Lachman; A. W. Karambelas

[57] ABSTRACT

A process for depositing on the surface of a substrate a layer of a chosen material having continuous gradations in refractive index in a predetermined periodic pattern. The substrate is exposed to two vapor phase reactants which react upon radiation-inducement to produce the chosen material, and the relative proportion of the reactants is varied in a predetermined and continuous sequence to produce continuous gradations in the stoichiometric composition and refractive index of the deposited layer as a function of thickness. Additionally, predetermined changes in refractive index and/or thickness across the horizontal surface of the substrate may be produced in combination with the change in refractive index as a function of thickness. Diffraction optical elements formed by such a process include various optical filters and reflective optical coatings.

22 Claims, 9 Drawing Figures

PROCESS FOR FORMING A GRADED INDEX OPTICAL MATERIAL AND STRUCTURES FORMED THEREBY

BACKGROUND OF THE INVENTION

1. Field of the Invention

This invention relates generally to the field of reflective optical materials and, more particularly, to a process for forming graded index optical materials for reflective diffraction optical elements, such as optical filters and reflective or transmissive optical coatings.

2. Description of the Prior Art

In various optical systems, it is often necessary to provide a filter in order to remove undesired radiation while at the same time allowing desired radiation to be efficiently transmitted or reflected. Such filters and coatings are used, for example, to provide protection from laser radiation for personnel, for electro-optical detectors, and for optical mirrors in a laser system, as a holographic lens in a head-up display system, or in night vision visors. The optical filters currently used for such purposes include absorption filters, reflective multiple layer dielectric filters, and diffraction filters generated by optical holographic techniques. However, each of these approaches to providing optical filters has certain disadvantages, as discussed below.

The absorption filter comprises a material which is impregnated with absorption dyes or materials with intrinsic absorption at the wavelength of the incoming laser radiation, as described, for example, in the book entitled "Handbook of Optics", W. G. Driscoll, ed., McGraw-Hill Book Co., New York, 1978, in Section 8 (Coatings and Filters), at pages 7 to 32. This type of protection has the serious disadvantage that the absorbing dye decreases the amount of transmitted radiation to unacceptably low levels. In addition, for laser applications, as the laser radiation energy increases, the radiation can damage the protective filter itself.

The reflective multiple layer dielectric filters typically consist of alternate layers of two dielectric materials of different refractive indices, which are formed on the surface of a substrate by known deposition techniques, such as chemical vapor deposition, sputtering, or thermal evaporation. When the optical thickness of each layer is chosen to be one-quarter of the wavelength of the radiation being reflected, such a structure is referred to as a "quarterwave stack", as discussed, for example, in U.S. Pat. No. 4,309,075 and in the book entitled "Handbook of Optics", previously referenced, in particular in Section 8. However, there are limitations on the spectral bandwidths which can be achieved by such structures, because of the limited material combinations available and the resulting restriction on the choices of index modulations. Moreover, defects at the abrupt interfaces between the layers in a multilayer structure can cause unwanted optical scattering. In addition, these defects can cause excessive absorption of radiation by the dielectric material, which can result in thermal damage to the optical filter. Furthermore, in a multilayer dielectric coating, the electric field is strongest at the interface regions between the high index material and the low index material. This highly localized field occurring at the abrupt interfaces can produce maximum temperature increases. Since the thermal expansion coefficients are different for the different dielectric materials of adjacent layers, high thermal stress is developed at the interface regions, which could cause delamination of the successive layers in the film. In addition, the high thermal stress could create microscopic dislocations which result in unwanted optical scattering by the film. Further, substrate roughness, pinholes and contaminants in the conventional multilayer structures formed by evaporation or sputtering techniques increase absorption and scattering, generate localized heating, reduce maximum reflectivity, and increase radiation damage. Finally, these multilayer coatings exhibit reflectance peaks at multiple wavelengths, which causes reduced optical transmission.

Diffraction optical elements have been generated using known methods of optical holography in photosensitive gelatin material, as discussed, for example, in the book entitled "Optical Holography", by Collier, Burckhardt, and Lin, Academic Press, New York, 1971, Chapter 9 (Diffraction from Volume Holograms) and Chapter 10 (Hologram Recording Materials), as well as in the book entitled "Handbook of Optical Holography", by Caulfield, Academic Press, New York, 1979, Chapter 10 (Application Areas). However, gelatin diffraction elements have environmental stability problems and are susceptibile to degradation by humidity and heat. In order to overcome this problem, a protective layer such as glass or a glass-like coating can be used, but such a layer complicates the manufacturing process and adds to unit cost. Moreover, such gelatin filters are limited to use for radiation in the wavelength range from the visible to the near infrared since sensitized gelatin is not sensitive to longer wavelength exposures. Consequently, filters for infrared applications cannot be fabricated in a gelatin structure. In addition, the index modulation in the gelatin, which is produced by exposure to the holographic interference pattern and subsequent development, is limited to a shape approximating a sinusoidal configuration or a roughly superimposed multiple sinusoidal configuration. Furthermore, the fabrication of a gelatin filter requires numerous steps, in particular numerous wet chemical steps for development, which are sensitive to processing variables, such as temperature or vibration, that affect the efficiency and peak wavelength of the final structure. In addition, since the resistance of gelatin to damage by heat or radiation is relatively low, gelatin filters are limited to low power applications. Finally, fabrication of a filter which reflects radiation at two selected wavelengths requires multiple exposure of the gelatin to two holographic patterns, which produces an irregular index profile that reduces the efficiency of the filter.

The present invention is directed to the fabrication of a high-efficiency diffraction optical element which alleviates the prior art problems discussed above, which are due to either the structure of the optical element or the process used for its fabrication.

SUMMARY OF THE INVENTION

The general purpose of the present invention is to provide a new and improved process for depositing on the surface of a substrate a layer of a chosen material having continuous gradations in refractive index in a predetermined pattern or profile as a function of the thickness of the layer. When such a graded index material is used as a diffraction optical element, it possesses most, if not all, of the advantages of the above-discussed prior art diffraction optical elements, while overcoming their above-mentioned significant disadvantages.

The general purpose of the present invention discussed above may be accomplished by exposing a chosen substrate to two or more selected vapor phase reactants which interact to produce the chosen material, and varying the relative proportions of the reactants in a predetermined and continuous sequence to produce continuous gradations in the stoichiometric composition of the chosen material deposited and corresponding gradations in the refractive index of the deposited layer as a function of thickness of the layer and in a predetermined pattern.

Accordingly, it is a further purpose of the present invention to provide a new and improved process for forming a homogeneous, compositionally graded optical filter.

Another purpose is to provide a new and improved process for forming a highly reflective optical coating.

Yet another purpose is to provide a process for depositing a film with continuously variable, periodic or predetermined changes in composition as a function of thickness.

Another purpose is to provide a process for depositing on a substrate a film with continuous gradations in refractive index as a function of thickness and continuous gradations in thickness or refractive index as a function of position along the horizontal surface of the substrate.

Still another purpose is to provide a process of the type described in which a low temperature, charge-free photochemical vapor deposition process is used to form the desired graded index optical material.

A further purpose of the present invention is to provide a new and improved optical filter, particularly useful for laser radiation.

Another purpose is to provide a new and improved highly reflective optical coating, particularly useful on laser mirrors.

Yet another purpose is to provide a new and improved diffraction optical element, particularly useful in a head-up display system.

The foregoing and other advantages and features of the present invention will become more readily apparent from the following more particular description of the preferred embodiments of the invention, as illustrated in the accompanying drawings.

BRIEF DESCRIPTION OF THE DRAWINGS

FIG. 5 shows a curve indicating the measured spectral reflectance of a holographic filter formed in accordance with the present invention, while

FIG. 7 presents the refractive index profile for a composite index filter formed in accordance with the present invention which reflects three separate wavelengths of radiation, while

DETAILED DESCRIPTION OF THE INVENTION

In order to form the continuously graded index optical material of the present invention, it is required that the process for forming such a material be capable of a high degree of control over the composition of the deposited material. For the deposition of a continuously graded index oxide material, a particularly useful process is the low temperature, charge-free photochemical vapor deposition process described in U.S. Pat. No. 4,371,587, assigned to the present assignee, and the details of which are incorporated herein by reference. In one embodiment of the latter invention, neutral, charge-free atomic oxygen is generated by the mercury-sensitized photodissociation of a chosen oxygen-containing precursor, such as nitrous oxide, as shown in Equations (1) and (2) below. Then, the atomic oxygen is reacted with a selected vapor phase reactant, such as silane, to form the desired oxide, silicon monoxide (SiO) or silicon dioxide ($SiO_2$), as shown in Equation (3) below.

(1)

where h = Planck's constant
$\nu$ = frequency of absorbed radiation (2)

(3)

In an alternative process embodiment disclosed in U.S. Pat. No. 4,371,587, the required atomic oxygen may be generated by the direct photodissociation of a chosen oxygen-containing precursor, such as nitrous oxide ($N_2O$), as shown in Equation (4) below. The atomic oxygen so formed reacts with the chosen vapor phase reactant as shown in Equation (3) above.

(4)

The composition of the oxide product of Equation (3) above depends, in part, on the steady state concentration of atomic oxygen, which, in turn, depends on the amount of nitrous oxide present for a given amount of silane. Thus, by varying the ratio of the silane and nitrous oxide reactants present at a given point in time, the composition of the silicon oxide ($SiO_x$) product can be controlled, to produce a corresponding control of the refractive index of the oxide material deposited. The composition of the $SiO_x$ can range from SiO with a refractive index of 1.9 to $SiO_2$ with a refractive index 1.45.

Figure 1:
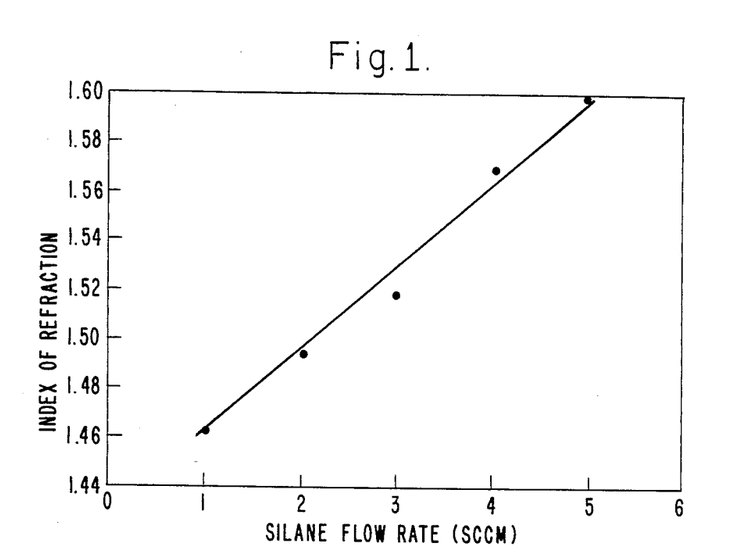
FIG. 1 presents a graph showing the change in the refractive index of a $SiO_x$ film which was deposited by a photochemical vapor deposition process, as a function of the flow rate of the silane reactant.

The composition of the oxide, as well as the rate of deposition, depends on the mass flow of each of the reactants, the pump throughput, and the intensity of the reaction-inducing radiation. For a constant value for pump throughput and radiation intensity, the effect of changes in the flow rate of one of the reactant gases can be determined. FIG. 1 presents a graph showing the change in the refractive index of a $SiO_x$ film which was deposited as described above, as a function of the flow rate of the silane reactant for a constant flow rate of $N_2O$ at 62.0 standard cubic centimeters per minute (sccm). As can be seen in FIG. 1, the refractive index and composition of the $SiO_x$ film have a well-defined dependence on the gas flow rate ratio of the reactants. As shown in FIG. 1, the index of the $SiO_x$ film was varied from 1.46 to 1.60 by varying the $SiH_4$ flow rate by as much as a factor of five, while keeping a fixed $N_2O$ flow rate. The large variation in flow rate required to achieve a change in refractive index ($\Delta n$) of 0.14 indicates that the index can be changed precisely and reproducibly by the above-described process.

Figure 2:
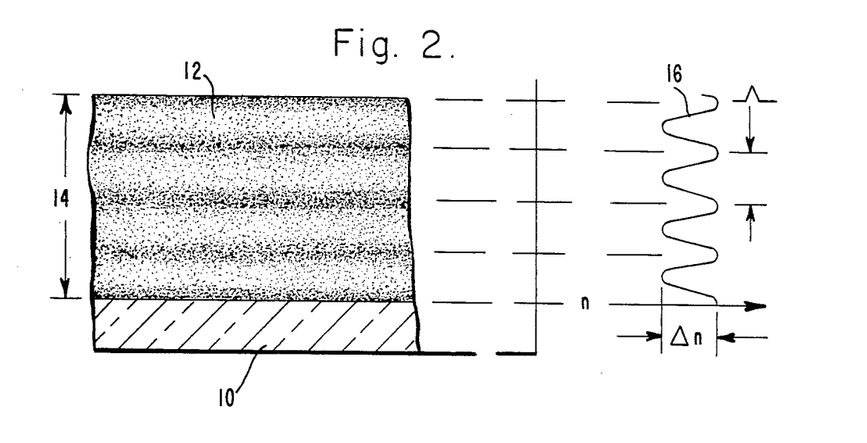
FIG. 2 is a schematic representation of the continuously graded index material in a sinusoidal pattern, formed in accordance with the present invention.

Consequently, in accordance with the process of the present invention, by accurately controlling the gas flow rate ratio of the silane reactant to the nitrous oxide reactant as a function of time, the composition of the $SiO_x$ product can be controllably and continuously altered as a function of time of deposition or thickness of the deposited material. In particular, the gas flow rate of the silane can be varied in a sinusoidal pattern to produce a corresponding sinusoidal variation in the composition of the $SiO_x$ deposited as a function of distance above the surface of the substrate, as shown in FIG. 2. The substrate 10, shown in FIG. 2 has a layer 12 of a continuously graded optical material, such as $SiO_x$, formed on the surface thereof by the above-described process. The composition of the $SiO_x$ material at a particular point along the depth or thickness 14 of the film 12 depends on the particular ratio of the reactant gases and the gas flow rate of silane at the time that particular material was deposited. Since the gas flow rate of the silane is varied in a sinusoidal pattern, the composition of the $SiO_x$ material in the layer 14 will vary in approximately the same sinusoidal pattern, taking into account small deviations from linearity. Further, since the refractive index of the $SiO_x$ material varies as the composition thereof, it follows that the refractive index (n) of the $SiO_x$ material likewise varies in a sinusoidal pattern 16 as a function of the thickness 14 of the layer 12, as shown in FIG. 2. Thus, there is a gradual change in the refractive index of the deposited layer 12 between upper and lower limits of n and in a predetermined pattern. The difference between the highest and lowest values of the refractive index of the $SiO_x$ material is $\Delta n$, the index modulation. The notation $\Lambda$ in FIG. 2 refers to fringe periodicity, the significance of which is discussed below with regard to wavelength of reflected light and Equation (5).

Furthermore, the gas flow rate of the silane may be varied in some other pattern besides a sinusoidal pattern, such as a quasi-sinusoidal, triangular, sawtooth, squarewave, or predetermined irregular pattern, to produce corresponding variations in the composition and refractive index of the deposited material.

Figure 3:
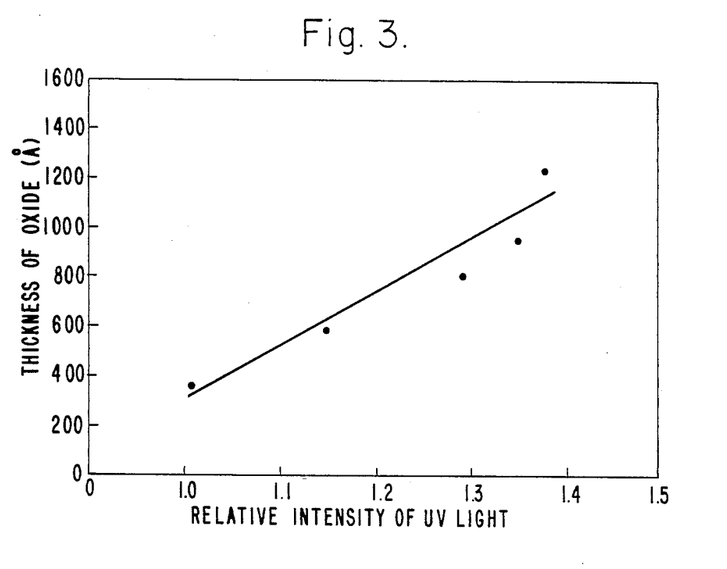
FIG. 3 presents a graph showing the dependence of the thickness of the deposited oxide on the relative intensity of the ultraviolet light used to initiate the photochemical vaor deposition reaction of one embodiment of the present invention.

In addition to the effect of the reactant gas flow rate ratio discussed above, it should also be noted that the intensity of the reaction-inducing ultraviolet radiation affects the rate of deposition of the oxide. FIG. 3 presents a graph showing the dependence of the thickness of the deposited oxide in a twenty-minute period on the relative intensity of the ultraviolet (UV) light used to initiate the photochemical reaction. As shown in FIG. 3, as the intensity of the UV light is increased, the thickness of the oxide deposited in a given time period or the deposition rate increases. The source of the UV light used to generate the data of FIG. 3 in accordance with the first process embodiment of the present invention was a bank of four mercury vapor arc lamps with a major output at a wavelength of 254 nanometers, at a distance of 2.75 inches (6.99 centimeters) from the substrate. Alternatively, a scanning laser beam may be used as the source of reaction-inducing radiation in accordance with the second process embodiment of the present invention, as discussed in further detail herein. In addition to the reaction parameters discussed above with regard to FIGS. 1 and 3, control of the gas-flow pattern and the gas pressure inside the deposition chamber is also necessary for producing reproducible and uniform oxide layers.

Figure 4A:
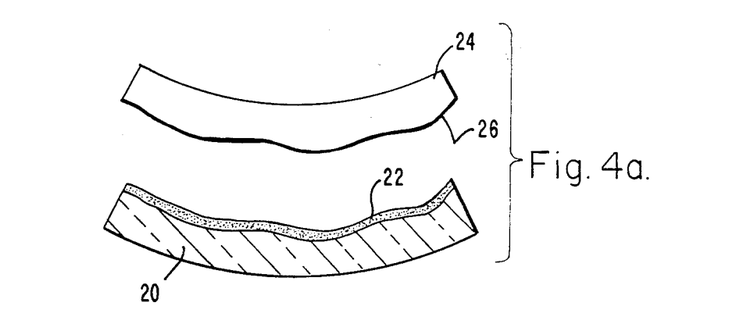
FIG. 4 is a schematic diagram of a structure having an aspherical substrate surface and a diffraction optical element formed on the surface thereof in accordance with the present invention.
Figure 4B:
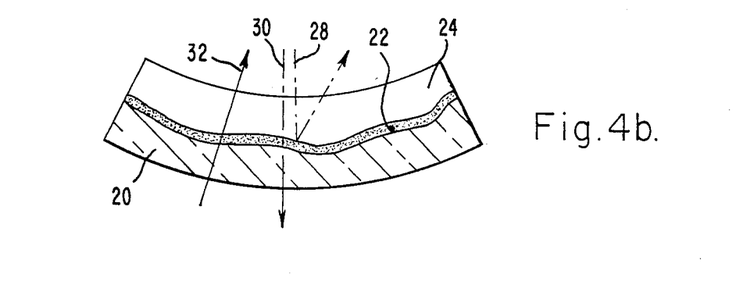

In accordance with the above-described process of the present invention, the modulated index layer is formed parallel to the substrate surface, to provide a zero-degree (non-slanted fringe) diffraction optical element. However, the modulated index layer of the present invention may alternatively be formed on an aspherical substrate which incorporates optical power, to provide a diffraction optical element which corrects for optical aberration or distortion, while providing undistorted see-through. Such a structure is shown schematically in FIGS. 4a and 4b. In FIG. 4a, there is shown a substrate 20 having an arbitrarily-shaped aspheric surface and formed, for example, of polycarbonate. On the surface of the substrate 20 and conforming thereto, there is formed in accordance with the process of the present invention a layer 22 comprising a continuously graded index optical material in a predetermined index pattern. As a separate element, there is shown in FIG. 4a a cover member 24, in which the surface 26 that faces the substrate 20 matches the surface profile of the substrate 20. The cover member 24 is laminated by means of epoxy or other optically transparent adhesive (not shown) to the substrate 20 having the layer 22 formed thereon, to provide the structure shown in FIG. 4b. As represented schematically in FIG. 4b, incident radiation 28 of a wavelength in the selected reflective band is reflected by the graded index layer 22; while radiation 30 with a wavelength outside the selected reflective band passes through the complete structure. When used in a head-up display system such as described in U.S. Pat. No. 3,940,204, assigned to the present assignee, incident radiation 28 is the light from a cathode ray tube which is diffracted by the graded index layer 22 to the eye of the viewer, and the radiation 32 is light from the environment outside the cockpit which is transmitted through the complete structure of FIG. 4b to the eye of the viewer. The ability to use such aspheric substrates greatly increases the number of diffraction optics applications which may be satisfied by the zero-degree diffraction optical element of the present invention. A structure such as shown in FIG. 4b is useful for head-up display diffraction optics combiners, for example, as previously discussed.

Further, it is anticipated that a slanted fringe diffraction optical element may be formed in accordance with the present invention by positioning the nozzle slits of one reactant gas near the substrates. The other reactant gas flows uniformly across the entire substrate surface; and the slits are separated at a distance equal to the fringe spacing on the substrate surface. The slant angle is controlled by the related movement of the substrate and the nozzle slits, as the deposition proceeds.

The significance of the above-described process for forming a continuously graded index optical material in a predetermined pattern is that such a process may be advantageously used to form a reflective diffraction optical element which performs as a conventional holographic filter, to diffract the incident light and produce a preselected diffraction effect, as described, for example, in the book entitled "Optical Holography", previously referenced, in Chapter 1 (Introduction to Basic Concepts).

The optical properties of a film consisting of discrete, multiple layers are well-described by multilayer matrix theory, as discussed, for example, by P. H. Berning in the book entitled "Physics of Thin Films", edited by G. Hass, Academic Press, New York, 1963, starting at page 69. This theory may be applied to the calculations of the optical properties of a graded index film by approximating the graded film as a stack of "N" very thin discrete-index layers. For "N" of a very large value, this approximation is sufficiently accurate for the devices of the present invention. Using this approximation and conventional multilayer film optical theory, the reflectance, transmittance, and absorbance for both s- and p-polarizations, as well as their averages can be calculated, preferably with the aid of a computer program, for graded-index films. These calculations can be made at any wavelength or angle of incidence for any graded-index coating configuration. The electric field and absorption profile within the coating can also be calculated. Such calculations indicate the feasibility of fabricating narrowband, high reflectance spectral filters by deposition of graded index films. This method of analyzing graded-index films is described, for example, by K. A. Winick, in the Final Scientific Report on "Thick Phase Holograms", Environmental Research Institute of Michigan, January, 1981.

Calculations of the optical properties of graded index films illustrate that the reflectance characteristic of the film depends primarily on the Fourier composition of the index profile. Thus, for example, a holographically exposed diffraction optical element with sinusoidal index modulation has the same performance at the designed reflection wavelength ($\lambda_p$) as that of the multilayer square modulation of equal periodicity whose fundamental Fourier component is of equal modulation amplitude. Consequently, for some diffraction optics applications where high reflectance at only a single wavelength is desired, the squarewave multilayer film and the sinusoidally modulated film are equally viable alternatives, in terms of optical properties. However, because of the disadvantages of the multilayer structure previously discussed, the sinusoidal profile or some other graded index profile which the process of the present invention provides, may offer distinct advantages over the multilayer squarewave profile.

Furthermore, the graded index film of the present invention may be designed to have any peak wavelength or wavelengths desired, barring materials limitations, by designing each sinusoidal component of the index profile to have a periodicity $\Lambda$ described in Equation (5) below.

$$\Lambda_i = \lambda_{pi}/2n \quad (5)$$

where
$\Lambda_i$ = periodicity of the $i^{th}$ sinusoidal component in the index profile
$\lambda_{pi}$ = $i^{th}$ peak wavelength
n = average index of refraction SiO$_x$ graded index filters are material-limited to a peak wavelength from 0.4 to 2.5 micrometers, since SiO$_x$ becomes highly absorptive outside this range. However, other materials besides SiO$_x$, such as aluminum oxide or zirconium oxide, may be used to form a layer with a graded index profile which reflects radiation at higher or lower wavelengths. Thus, by the process of the present invention, diffraction optical elements may be formed to reflect radiation in the ultraviolet, visible and infrared ranges.

In addition, in accordance with an alternative to the first process embodiment of the present invention, the peak reflection wavelength ($\lambda_p$) may be varied across the horizontal surface of the diffraction optical element by varying the localized reactant gas flow rate across the substrate surface as desired or by varying the intensity of the reaction-inducing radiation, as discussed herein, to produce variations in the thickness, refractive index, periodicity, and $\lambda_p$ of the deposited material. Such devices with horizontal variations of $\lambda_p$ have been heretofore unattainable.

Moreover, the process of the present invention may be used to form layers which exhibit modulation in either absorptivity or refractive index or both, since there is a known relationship between absorptivity and refractive index. Absorptivity $\alpha$ is defined in Equation (6) below, and the relationship thereof to refractive index is defined in Equation (7) below.

$$\alpha = 4\pi k/\lambda \quad (6)$$

where
$\alpha$ = absorptivity
k = extinction coefficient
$\lambda$ = wavelength of incident radiation $$N = n - ik \quad (7)$$

where
N = complete refractive index
n = real refractive index
k = extinction coefficient Thus, in the same way that variations in n, the real refractive index, of a layer of material may be produced as previously described herein, so may corresponding variations in the extinction coefficient, k, of a layer of material be produced. For example, photochemically deposited oxides, such as SiO$_x$, have a cutoff region (e.g. about 2.5 micrometers for SiO$_x$) at which they become highly absorptive, and the absorptivity is highly dependent on the stoichiometric composition. Thus, by varying the stoichiometric composition of SiO$_x$ in accordance with the present invention, a structure may be produced which exhibits modulation of absorptivity as well as refractive index. Consequently, the detailed discussion herein with respect to "refractive index" is intended to include the "complex refractive index" described above.

Figure 5:
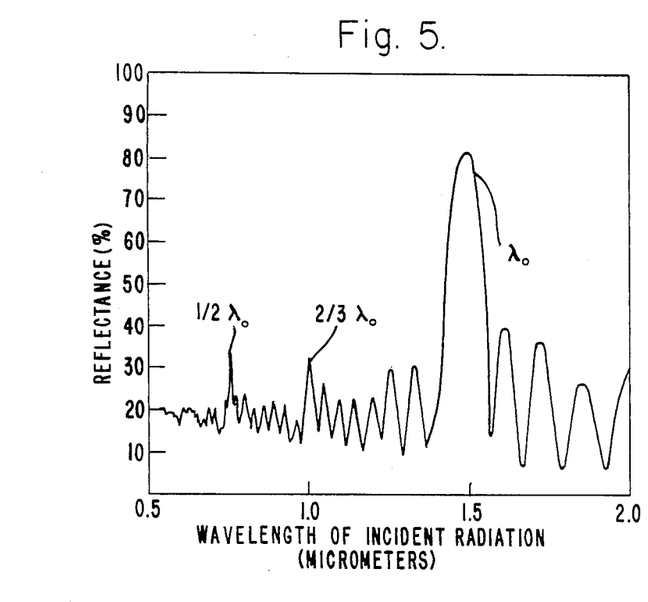

Using the above-described photochemical vapor deposition process as further described in Example 1, an oxide holographic filter was formed with a 16-period, sinusoidally modulated refractive index that varied between 1.45 and 1.63, producing a peak wavelength at 1.48 micrometers ($\mu$m). The spectral reflectance of the holographic filter was measured for various wavelengths of incident radiation using a spectrophotometer and known precedures, and the curve obtained is shown in FIG. 5. A reflectance of 81.3 percent at the fundamental wavelength ($\lambda_o$) of 1.48 micrometers was obtained, as shown in FIG. 5. This reflectance value is to be compared to the theoretical prediction of 94.1 percent reflectance at 1.48 μm shown in FIG. 6, which was based on the theory and calculations previously discussed.

Figure 6:
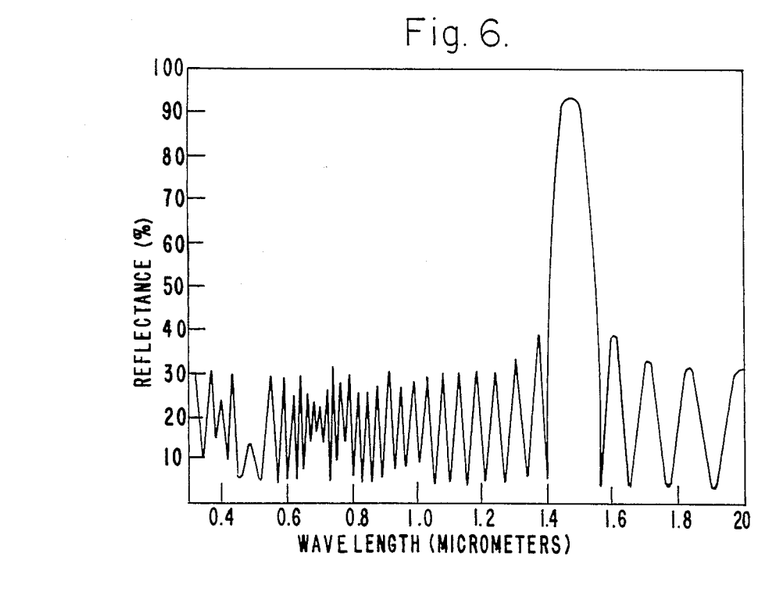
FIG. 6 presents the theoretical reflectance for such a structure.

The fact that the measured reflectance peak of 81.3 percent in FIG. 5 deviated somewhat from the predicted 94.1 percent in FIG. 6 indicates that the modulated-index pattern of the deposited film deviated somewhat from the intended sinusoidal pattern. This conclusion is supported by the observation of small reflectance peaks in FIG. 5 at higher-order harmonics: ½ $\lambda_o$ (0.75 μm) and ⅔ $\lambda_o$ (1.0 μm). Each reflectance spike corresponds to a particular Fourier component of the refractive index profile. Therefore, a perfect sinusoidally modulated index profile will exhibit only one reflectance peak, at the fundamental wavelength of $\lambda_o$. The fact that the higher-order peaks in FIG. 5 are low-amplitude indicates that the deviation of the film from sinusoidality is relatively small. It is anticipated that an accurate sinusoidal pattern for the refractive index profile can be achieved by using a monitoring and feedback loop control system for measuring refractive index and thickness of the film as deposited. The more accurate the sinusoidally modulated index profile, the higher the reflectance value at the fundamental wavelength.

In addition, with regard to FIG. 5, the absence of a measured reflectance peak at $\lambda_o/3$ (0.5 μm), which is characteristic of a multilayer structure, indicates that this coating is not a discrete-layer quarterwave stack, and is consistent with the result predicted for a sinusoidally modulated film.

The above-described theory and calculations can be used to determine the feasibility of fabricating other narrowband, high reflectance spectral filters by the process of the present invention. For example, using such calculations, it has been determined that a coating design with reflectivity of 99.97 percent at 0.53 μm can be achieved with a sinusoidal index profile having a modulation of 0.105 and a thickness of 15 μm. It has also been determined that as the film thickness increases, the index modulation can be reduced and applied for an increased number of cycles, while still maintaining the required reflectivity. Another factor for consideration is the reflectance bandwidth. The larger the index modulation, the wider the reflectance bandwidth at a given thickness or at a given efficiency level, which causes reduced photopic see-through or signal transmission. As another example, it has been determined from such calculations that an optical coating design with a reflectivity of 99.93 percent at 1.315 micrometers can be achieved with a graded index layer of $SiO_x$ having a sinusoidal profile, with an index modulation of 0.42, a thickness of 8.2 micrometers, and a modulation period of 0.396 micrometers.

Figure 7:
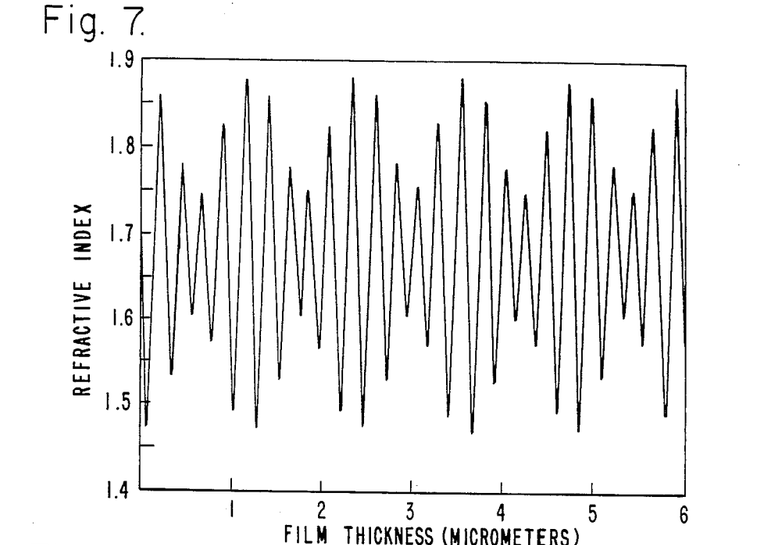
Figure 8:
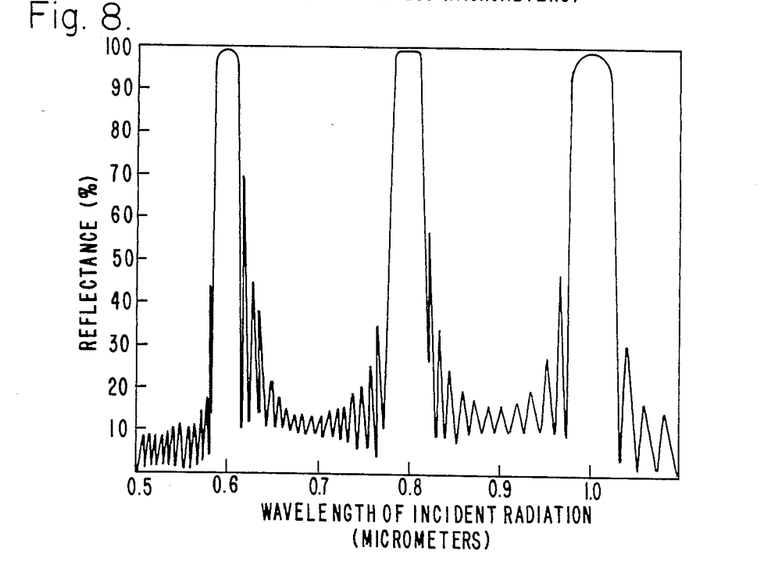
FIG. 8 presents the spectral response for such a composite index filter.

Furthermore, in accordance with the process of the present invention, there may be formed a coating with a composite index profile which is the linear superpositioning of a number of sinusoidal index profiles and which exhibits high reflectance at multiple wavelengths corresponding to the individual sinusoidal index profiles. This kind of composite profile can be designed analytically as described above and fabricated using the graded index process of the present invention. For example, the three separate index profiles required to provide protection against three separate wavelengths of radiation at 0.6 μm, 0.8 μm, and 1.0 μm are combined to form the composite refractive index profile versus film thickness shown in FIG. 7. Using the composite profile index of FIG. 7 for a total film thickness of 16 micrometers on a glass substrate, the theoretical reflectance of such a device at various wavelengths is shown in FIG. 8. The extremely high reflectance at 0.6 μm, 0.8 μm, and 1.0 μm is evident in FIG. 8. In a similar manner, other coatings may be formed with other index profiles which are analytically synthesized to provide particular optical characteristics.

In addition, the photochemical vapor deposition process of U.S. Pat. No. 4,371,587 can be used to produce many different oxide films, such as $SiO_2$, $TiO_2$, $Al_2O_3$, $Ta_2O_5$, and $SnO_2$. Further, such a process can be used to provide a film structure that consists of two oxides with compositions that change gradually and continuously from one oxide to another. For a composite oxide film of $SiO_2$, with a refractive index of 1.45, and $TiO_2$, with a refractive index of 2.55, the maximum index modulation achievable is 1.1, as compared to the 0.45 modulation achieved in the $SiO_x$ oxide system. The indices of some other useful oxides are 1.76 for $Al_2O_3$, and 2.18 for $ZrO_2$.

Finally, as a practical matter, preliminary analysis has shown that the tolerance on the thickness and index variation are higher for the graded index film structure of the present invention than for a prior art multilayer quarterwave stack coating. It is anticipated that if a reasonably precise monitoring system for thickness and refractive index in installed, the photochemical vapor deposition process of the present invention will produce coatings with excellent reflectance, and showing minimum degradation due to the random error associated with the deposition process.

There are several advantages in forming a reflective diffraction optical element for use as a holographic filter by the process of the present invention. First, the holographic filter is formed of an oxide material which is inherently stable in high humidity and over a wide temperature range, whereas conventional gelatin holograms are not. In addition, the $SiO_x$ formed by the photochemical vapor deposition process has exhibited superior adhesion on glass, as well as plastics such as polycarbonate, and conforms to the shape of the substrate surface. The latter two properties make the process of the present invention particularly well suited for the fabication of head-up display combiners or night vision visors on curved substrates. Moreover, the $SiO_x$ of the present invention can be deposited at a temperature sufficiently low (e.g. 30° to 200° C.) so as to avoid thermal degradation of a plastic substrate, which makes possible the use of light weight plastic substrates in laser eye protection devices and head-up display devices. Further, the $SiO_x$ formed as described herein possesses excellent optical and mechanical properties, such as good surface morphology and low pinhole or defect density, which result in reduced optical scattering. In addition, the low defect density of such an oxide makes it less susceptible to laser radiation damage. Further, by the process of the present invention, a continuously graded index optical material is deposited, and, thus, avoids the previously discussed prior art problems, such as reduced transmission, optical scattering, and thermal damage, caused by the juxtaposition of discrete layers of differing composition. By using the continuously graded index reflective coating of the present invention, the prior art problems of localized concentration of mechanical stresses as well as a concentration of the electric field are avoided. It has been analytically determined that the peak electric field in a filter with a sinusoidal profile is less than the peak electric field encountered in a square-wave multilayer filter having identical optical properties at the desired wavelength. In addition, the gradual change in composition in the material formed in accordance with the present invention reduces the thermal stress in the film when subjected to the high laser energy flux. This reduced thermal stress is expected to increase the laser damage threshold. The gradual compositional change may also reduce the absorptance of the film. In addition, a better thermal match with the substrate may also be attained by adjusting the composition of the dielectric at the substrate interface so that the substrate and dielectric have compatible thermal expansions.

Moreover, the index of refraction of the material deposited in accordance with the present invention can be adjusted to a predetermined profile, which permits greater flexibility in the design of the optical element. In particular, the optical element of the present invention can be formed as a non-sinusoidal profile to provide high reflectance at several wavelengths, as previously discussed with regard to composite index profile devices. These latter devices are novel optical devices which have not been possible heretofore, such as a multiple-wavelength narrowband reflective diffraction optical element incorporated in a single deposited layer, which is useful in two-color head-up display combiners, laser eye protection visors, and reflective coatings on laser mirrors. In addition, the periodicity of the profile can be changed to reject any predetermined laser line within the spectral band of the deposited material, e.g. a peak wavelength from 0.3 to 2.5 $\mu$m for $SiO_x$. Further, because the optical devices of the present invention can be constructed to provide high reflection of radiation within a narrow bandwidth, such devices have high transmission of the signal of interest and enhance the efficiency of signal detection. In addition, the devices of the present invention can provide high reflection over a wide wavelength region (e.g., 0.3 to 2.5 micrometers or greater for $SiO_x$ or up to 5 micrometers for $Al_2O_3$) by use of a material having the appropriate refractive index.

Further, the continuously graded index holographic filters of the present invention can be fabricated by a photochemical vapor deposition process which is charge-free and avoids charge damage or radiation damage to sensitive devices, such as charge-coupled devices and compound semiconductor devices. In addition, such a process is performed at a low temperature, e.g., 30° to 200° C., and avoids thermal damage to temperature-sensitive substrates, as well as stress caused by thermal mismatch of the substrate and deposited layer. Moreover, the material deposited by this photochemical vapor deposition process has excellent surface morphology, low pinhole density, low impurity content, low stress, large area uniform thickness, and conformity to substrate shape. The process of the present invention is highly reproducible and capable of large-scale production of uniform deposits. Finally, by the above-described process, a holographic filter can be fabricated by a single step process, which reduces fabrication complexity and cost. It is particularly noteworthy that by the process of the present invention a filter which protects against multiple wavelengths of radiation can be fabricated in a single device by a single step process.

Further, the process of the present invention may be used to form a reflective coating on the surface of a mirror substrate to provide a surface with high reflectivity, low absorption, and low scattering. Such a highly reflective film is useful on mirrors provided in laser systerms to reflect and guide the laser beam. In order to form such a reflective coating, the process previously described herein with particular reference to FIG. 5 is performed on a molybdenum or silicon mirror substrate, for example. The reflectance of this coating was measured at various wavelengths of incident radiation and the results are as shown in the curve of FIG. 5 previously discussed. In order to improve adhesion and decrease stress, it may be advantageous in some cases to use a binder material, such as chromium or titanium, between the substrate and the graded index material. Such a metal binder may also be used to reduce the thickness requirement of the deposited film at a particular index modulation.

Furthermore, in accordance with a second process embodiment of the present invention, a continuously graded index optical material may be deposited by the photochemical vapor deposition process previously described herein except that a scanning laser beam or other collimated beam is used as the source of radiation to initiate the desired chemical reaction. The laser beam may be scanned across the surface of the substrate or other means may be used to effect relative movement of the laser beam with respect to the substrate, such as moving the substrate or adjusting the optical focusing system, as is known in the art and described, for example, in U.S. Pat. No. 4,340,617. The laser beam or other collimated beam used has an output at the wavelength of radiation required to induce the desired photochemical reaction, as previously discussed herein. The beam is scanned across the surface of the substrate in a controlled manner so that one segment of the substrate at a time is exposed to the beam, with the segment size being determined by the beam diameter. The rate of deposition of the reaction product depends on the amount of reaction-inducing radiation to which the reactants are exposed. Consequently, if a given segment of the substrate has a longer exposure to the laser beam, that segment will have an increased amount of reactive product deposited thereon. Thus, a spatial variation of the deposition rate over the horizontal surface of the substrate can be achieved by controlling the scanning speed or duty cycle and pattern of the laser beam. Since the deposition rate determines the thickness of the deposited layer, the thickness of the deposit and the refractive index thereof are likewise varied over the lateral surface of the substrate in accordance with the above-described scanning laser beam exposure. This variation in thickness may be in a continuous manner or in a stepped manner, as determined by the scanning pattern of the laser beam. The resulting structure has a continuously graded index layer as a function of thickness as previously described herein, and, in addition, the thickness of that layer varies in a predetermined pattern across the surface of the substrate. Since the amount of modulation within a given thickness determines the periodicity of the index modulation, the deposited layer on different segments of the substrate surface will have different periodicities. As previously discussed with regard to Equation (5) herein, the periodicity of the index modulation determines the peak wavelength of reflected radiation. Consequently, in accordance with this second process embodiment of the present invention, a diffraction optical element may be formed to have different peak wavelengths of reflection and/or thickness at various segments of the substrate surface. Such a structure is useful as a combiner in a head-up display system. Alternatively, in accordance with the second process embodiment of the present invention, the amount of reaction-inducing radiation to which predetermined segments of the substrate are exposed may be varied by using a flood source of ultraviolet radiation and a mask placed close to the substrate surface to prevent the radiation from striking the substrate at predetermined segments.

The first and second process embodiments of the present invention may be used to provide various optical elements with varying thickness and/or refractive index across the horizontal surface thereof, in addition to the modulated refractive index as a function of thickness as previously described. In one case, the refractive index is modulated as a function of thickness to provide a chosen $\lambda_p$ as described with regard to the first process embodiment and, in addition, the thickness of the deposited layer is varied in a desired pattern, such as to form a convex surface, as described above with regard to the second process embodiment. The resulting structure has a horizontal variation in thickness and the same $\lambda_p$ across the horizontal surface of the structure. A structure having such a variation in thickness provides a change in the efficiency of the diffraction element across the horizontal surface thereof, which is advantageous for compensating for spatial nonuniformity in the intensity of the incident radiation. In a second case, the thickness of the deposited layer is varied in a desired pattern as described immediately above, and, in addition, $\lambda_p$ is varied across the horizontal surface of the layer as previously described with respect to an alternative of the first process embodiment of this invention. The resulting structure has a horizontal variation in thickness and variations in $\lambda_p$ across the horizontal surface of the structure. In a third case, the thickness of the deposited layer is held constant and the refractive index of the deposited layer is varied across the horizontal surface of the substrate to produce variations in periodicity and $\lambda_p$, as described above. In such a structure, variations in $\lambda_p$ across the horizontal surface of the substrate are not dependent on the thickness of the deposited layer. The constant thickness of such a structure may be achieved by placing a cover with an iris opening over the substrate and opening or closing the iris over a given segment of the substrate to control the amount of radiation striking the substrate segment, while at the same time altering the intensity of the radiation or the reactant gas flow rates in order to achieve the required modulated refractive index as a function of thickness and as a function of horizontal position on the substrate surface.

In summary, the following are some of the unique characteristics of the process of the present invention which provide conventional optical filter devices with improved performance, as well as novel filter devices heretofor unavailable:

a. arbitrary profile of (complex) refractive index modulation by control of reactant flow rate ratio;
b. high index modulation;
c. variable peak wavelength across the surface of the substrate;
d. low temperature deposition;
e. uniform coating conformed to substrate shape; and
f. versatility in deposition materials.

In particular, some of the new and improved optical devices which may be formed in accordance with the present invention are:

a. wide angle optical filters with variable $\lambda_p$ across the filter for wide angle receptions, such as bandpass filter, narrowband transmission or reflection filter, cut off filter;
b. absorption or transmission type apodizer to provide even intensity across the resultant beam, such as variable density neutral density transmission filter, variable reflection filter;
c. surface grating with grating profile shaped by the UV light profile and/or the variable index through grating depth;
d. variable index coating on substrates or fiber cores to form special optical devices, such as optical fibers or integrated optics elements;
e. element for replication of masks and computer generated holograms;
f. IR and visible filter for laser hardened IR detector and solid state components, such as a laser protection filter for detectors, or for personnel laser eye protection;
g. narrowband, single color or multi-color, transmission or reflection or cut-off type filters;
h. thin lens with variable surface profile and variable index throughout or across the lenses;
i. anti-reflection, or high reflectivity filters on plastic substrates or on glass substrates;
j. any of the above coatings on aspheric substrates; and
k. slanted fringe holographic or optical devices.

Moreover, the process of the present invention is not limited to the use of oxides of silicon, but may include any of the oxides which may be deposited by the process disclosed in U.S. Pat. No. 4,371,587, previously referenced herein. In addition, other materials besides oxides may be deposited as described herein by other photochemical processes, such as silicon nitride by the process disclosed in U.S. Pat. No. 4,181,751, assigned to the present assignee, and various sulfides by the process disclosed in copending patent application Ser. No. 387,086, now U.S. Pat. No. 4,447,467 assigned to the present assignee. Further, combinations of these various materials may be used, such as silicon dioxide in combination with silicon nitride. As a practical matter, the material deposited in accordance with the present invention must be stable in the presence of air and water vapor.

Furthermore, the present invention is not limited to photochemical vapor deposition processes, but includes other known deposition processes in which the reactant gas flow rate ratios are controlled as described herein to provide a continuously graded index optical material with a predetermined index profile. For example, in a thermal chemical vapor deposition process in which reactants are heated to a sufficiently high temperature to bring about a chemical reaction to form a desired product, the gas flow rate ratio of the reactant gases is controlled in the manner previously discussed herein. A type of thermal chemical vapor deposition of particular interest in this regard is the deposition of an epitaxial layer by metallo-organic chemical vapor deposition. In a thermal evaporation or physical vapor deposition process in which two sources, such as zinc sulfide and zinc selenide, are heated to produce evaporation thereof and subsequent condensation on the substrate, the thermal evaporation of one source, such as zinc sulfide, is held at a constant rate while the thermal evaporation of the second source is varied as a function of time, in the manner discussed herein. Similar methods can be used in electron beam evaporation techniques and sputter evaporation techniques using two targets. Likewise, in a molecular beam epitaxial growth process in which an epitaxial layer of a material is grown by causing beams of atoms or molecules to impinge on the target, the relative proportion of the impinging beams can be altered as described herein to provide an epitaxial layer having a graded refractive index in a predetermined pattern.

EXAMPLE 1

This example illustrates the formation of a continuously graded index optical material in a predetermined pattern suitable for use as a holographic filter, in accordance with the first process embodiment of the present invention as previously described herein. The photochemical vapor deposition process and apparatus described in U.S. Pat. No. 4,371,587, previously referenced herein, were used to deposit a film of $SiO_x$ on a glass slide substrate having dimensions of 2 inches (5.08 cm) by 3 inches (7.62 cm) and 40 mils (0.10 cm) thick. The vapor phase reactants were silane ($SiH_4$) and nitrous oxide ($N_2O$), and mercury was used as a photosensitizing agent. The reaction-inducing radiation was at a wavelength of 2538 Å; the substrate temperature was 100° C.; and the total operating pressure was approximately one torr (millimeter of mercury). Alternatively, an operating pressure within the range of about 0.1 to 50 torr may be used. The reactant gases $SiH_4$ and $N_2O$ entered at one end of the deposition chamber through mass flow controllers which control the flow of the reactant gases. The flow of reactant gases was initiated and followed by adjustment of total pressure, gas flow rates, gas flow ratios, and substrate temperature. Gas pressure during deposition was kept constant and the substrates were positioned so that there was minimum disruption of the laminar gas flow pattern. Upon system equilibration, the deposition of $SiO_x$ was initiated by transmission of the reactioninducing radiation into the reaction chamber, using the data of FIG. 3, previously discussed, to determine the required intensity of light. A bank of four low-pressure mercury vapor lamps, obtained from Canrad-Hanovia, Inc. of Newark, N.J., was used as the source of light and was located approximately 2.75 inches (6.99 centimeters) from the substrate surface. The gas flow rate of $N_2O$ was held constant at 62.0 sccm and the gas flow rate of $SiH_4$ was varied in a controlled manner from 0.90 sccm to 3.5 sccm.

Using the previously discussed data of FIG. 1 and a graph generated from experimental data to show the change in flow rate with time, the flow rate of the silane reactant was altered with time by manual turning of the gas flow controller knob at a predetermined rate to produce an oxide film with a refractive index that varied in a continuous sinusoidal pattern from 1.45 to 1.63, for a total of 16 periods, producing a peak wavelength of 1.48 μm. The measured spectral reflectance of the holographic filter so formed is presented in FIG. 5, showing an 81.3 percent peak efficiency, and this data has been previously discussed in detail. Such a structure is useful, for example, as a highly reflective coating on the surface of a mirror used in a laser system, in order to provide maximum transmission of the laser signal and minimum laser damage to the mirror.

EXAMPLE 2

This example illustrates the formation of a layer of a contiuously graded index optical material on the surface of a substrate in accordance with the process of the present invention, in which a composite oxide film of silicon dioxide ($SiO_2$) and titanium dioxide ($TiO_2$) is formed, to provide a maximum refractive index modulation of 1.1.

The process described in Example 1 above is followed except that titanium tetrachloride ($TiCl_4$) is used as an additional vapor phase reactant. As described in U.S. Pat. No. 4,371,587, the atomic oxygen formed by the photochemical dissociation of the nitrous oxide reacts with the $TiCl_4$ to form titanium dioxide. In accordance with the present invention, the gas flow rate of nitrous oxide is held constant and the gas flow rates of $SiH_4$ and $TiCl_4$ are varied in a controlled manner with respect to each other and with repect to the nitrous oxide. The required flow rates of the $SiH_4$ and $TiCl_4$ are determined from experimental data which indicate the dependence of the refractive index of the deposited material on the flow rates. The $SiH_4$ and $TiCl_4$ reactants each react with the atomic oxygen to form $SiO_2$ and $TiO_2$, respectively, which deposit simultaneously on the substrate to provide a composite oxide film comprising $SiO_2$ and $TiO_2$. The composition of the composite oxide may vary from pure $SiO_2$ with a refractive index of 1.45 along the continuum to pure $TiO_2$ with a refractive index of 2.55. The resulting composite oxide film has a continuously graded refractive index as a function of thickness, with a maximum index modulation of 1.1.

EXAMPLE 3

This example illustrates the formation of a layer of a continuously graded index optical material on the surface of a glass substrate in which the index also varies in a predetermined pattern across the surface of the substrate, in accordance with the second process embodiment of the present invention as previously described herein. The general procedure described in Example 1 is followed except that the source of radiation is a scanning laser beam comprising an argon-fluoride tunable excimer laser and associated electronics and optics obtained from Lumonics of New Jersey and a raster scanning mechanism obtained from General Scanning, Inc. of Watertown, Mass. Under computer-control, the laser beam is scanned in a predetermined pattern across the horizontal surface of the substrate, as described in U.S. Pat. No. 4,340,617, for example. There is deposited on the substrate a layer of a material, such as $SiO_x$, which has a continuously graded refractive index as a function of the thickness of the deposited layer and also a graded refractive index radially across the horizontal surface of the substrate in a pattern corresponding to the pattern of the scanning laser beam.

While the present invention has been particularly described with the respect to the preferred embodiments thereof, it will recognized by those skilled in the art that certain modifications in form and detail may be made without departing from the intention and scope of the invention. In particular, the scope of the invention is not limited to the photochemical vapor deposition of a continuously graded index layer of oxides of silicon, which was used merely as an example, but is intended to include oxides, nitrides, sulfides, and other materials and combinations thereof, with suitable optical properties. In addition, while the preferred process embodiment of the present invention has been referred to as a "photochemical vapor deposition process", it is not intended to limit the present invention to the process embodiment of U.S. Pat. No. 4,371,587 in which atomic oxygen is photochemically generated; rather it is intended to include any oxide formed by any process embodiment of the latter patent.

Moreover, while the present invention has been described with reference to a particular photochemical vapor deposition process which is specifically controlled in order to form an oxide having a continuously graded refractive index in a predetermined pattern, it will be recognized that other known deposition processes for forming oxides, as well as other materials, may be similarly controlled to achieve a deposited layer having the same graded index profile and optical properties as described herein. Other materials which may be used to form the graded index layer are characterized by being dielectrics which are transmissive in the wavelength range of interest.

Further, the present invention is not limited to the particular refractive index profiles specifically disclosed herein, but is intended to include any predetermined profile. In addition, it is not intended to limit the present invention to the particular process details described herein, but to include any variations in process parameters as may be required in order to achieve the desired refractive index profile in the deposited material.

Finally, the present invention is not limited to the uses of the continuously graded index materials as specifically set forth herein, but includes structures comprising such continuously graded index materials which may be used for any purpose.

What is claimed is:

1. A process for depositing on the surface of a substrate a layer of a chosen material in which the index of refraction of said layer varies in a predetermined continuous and periodic pattern as a function of the thickness of said layer, comprising the steps of:
   (a) providing said substrate;
   (b) providing first and second selected vapor phase reactants which react upon inducement by radiation of a selected wavelength to form said chosen material which deposits on said substrate;
   (c) exposing said substrate to said first and second vapor phase reactants in predetermined proportions in the presence of said radiation to deposit said chosen material having a first predetermined stoichiometric composition and a first predetermined index of refraction;
   (d) altering said predetermined proportions of said first and second vapor phase reactants as a function of time in a continuous manner to correspondingly alter in a continuous manner said stoichiometric composition and said index of refraction of said chosen material deposited as a function of time and to thereby produce said graded index of refraction in said chosen material; and
   (e) repeating said altering of step "d" for the number of times required to produce said variation of said refractive index in said predetermined continuous and periodic pattern as a function of said thickness of said layer.

2. The process set forth in claim 1 wherein said variation in said index of refraction of said layer produces a profile selected from the group consisting of a sinusoidal, a quasi-sinusoidal, a superimposed multi-sinusoidal, a squarewave, a triangular, a sawtooth, and a predetermined irregular pattern.

3. The process set forth in claim 1 wherein the intensity of said radiation is substantially constant with time and said radiation exposes the total said surface of said substrate at the same time.

4. The process set forth in claim 1 wherein the intensity of said radiation to which selected segments of said surface of said substrate are exposed is varied in a predetermined pattern across said surface.

5. The process set forth in claim 1 wherein said radiation comprises a collimated beam and said radiation exposes selected segments of said surface of said substrate in turn, each for a predetermined period of time to thereby deposit said layer with a thickness which varies from one said selected segment to the next in a predetermined pattern across the horizontal said surface of said substrate.

6. The process set forth in claim 5 wherein said radiation comprises a scanning laser beam wherein the exposure time of said selected segments to said laser beam is varied in a selected pattern.

7. The process set forth in claim 1 which further includes performing said exposing of step "c" in the presence of mercury vapor to sensitize said reaction upon said inducement by said radiation.

8. A process for depositing on the surface of a substrate a layer of an oxide material with a graded index of refraction and a predetermined periodic refractive index profile throughout the thickness of said layer, comprising the steps of:
   (a) providing said substrate;
   (b) providing a selected vapor phase reactant and a chosen oxygen-containing precursor which react upon inducement by radiation of a selected wavelength to form said oxide material which deposits on said substrate;
   (c) exposing said substrate to said vapor phase reactant and said oxygen-containing precursor in predetermined proportions in the presence of said radiation to form said oxide material having a first predetermined stoichiometric composition and a first predetermined index of refraction;
   (d) altering said predetermined proportions of said vapor phase reactant and said oxygen-containing precursor as a function of time in a continuous manner to correspondingly alter in a continuous manner said stoichiometric composition and said index of refraction of said oxide material deposited as a function of time and to thereby produce said graded index of refraction in said oxide material; and
   (e) repeating said altering of step "d" for the number of times required to produce said predetermined periodic refractive index profile throughout said thickness of said layer.

9. The process set forth in claim 8 wherein:
   (a) said oxide is a silicon oxide, $SiO_x$ where x has a value within the range of 1 to 2;
   (b) said vapor phase reactant is silane ($SiH_4$);
   (c) said oxygen-containing precursor is nitrous oxide ($N_2O$);
   (d) said exposing is performed in the presence of mercury vapor;
   (e) said index of refraction is graded over the range from 1.45 to 1.9; and
   (f) said predetermined periodic refractive index profile has a sinusoidal pattern.

10. The process set forth in claim 8 wherein:
   (a) said oxide material comprises a composite of first and second oxides and the composition of said oxide material varies in a gradual and continuous manner along the continuum from said first oxide alone to said second oxide alone;

(b) first and second vapor phase reactants are provided as precursors to said first and second oxides;

(c) a third vapor phase reactant is provided to chemically interact with said first and second vapor phase reactants to form said first and second oxides; and (d) said predetermined proportions of said first, second, and third vapor phase reactants are altered in said continuous manner to produce said predetermined refractive index profile throughout said thickness of said layer of said oxide material.

11. An article of manufacture comprising:
(a) a selected substrate; and
(b) a layer of a uniform chosen material deposited on the surface of said substrate to a predetermined thickness wherein said layer as deposited has a stoichiometric composition which varies in a predetermined periodic and continuous pattern as a function of said thickness to produce successive gradations in the index of refraction in said layer in said predetermined periodic pattern.

12. An article of manufacture formed by the process set forth in claim 1.

13. The article set forth in claim 12 wherein said layer povides reflection of radiation of a predetermined wavelength impinging on said layer.

14. The article set forth in claim 12 wherein said layer provides transmission of radiation of a predetermined wavelength impinging on said layer.

15. The article set forth in claim 12 wherein:
(a) said substrate is an optical mirror; and
(b) said layer comprises homogeneous compositionally graded silicon oxide.

16. The article set forth in claim 12 wherein:
(a) said substrate is selected from the group consisting of a glass and a plastic material;
(b) said chosen material is an oxide of silicon;
(c) said index of refraction varies from 1.45 to 1.63; and
(d) said predetermined periodic profile is sinusoidal.

17. An article of manufacture comprising:
(a) a selected substrate; and
(b) a layer of a chosen material deposited on the surface of said substrate to a thickness having a predetermined profile wherein the stoichiometric composition of said layer as deposited varies in a first predetermined periodic and continuous pattern as a function of thickness and in a second predetermined pattern across the horizontal said surface of said substrate to produce successive gradations in said index of refraction in said first and second predetermined patterns as a function of said thickness and as a function of the lateral position on said horizontal surface of said substrate.

18. The article of claim 17 wherein said article is a diffraction optical element, said layer is of uniform thickness, and the peak reflection wavelength of said optical element varies across said horizontal surface of said substrate in a manner corresponding to said second predetermined pattern.

19. The article of claim 17 wherein said article is a diffraction optical element, said thickness varies across said surface of said substrate in said predetermined profile and the peak reflection wavelength of said optical element varies across said horizontal surface of said substrate as a function of said thickness and said second predetermined pattern.

20. An article of manufacture comprising:
(a) a selected substrate; and
(b) a layer of a chosen material deposited on the surface of said substrate to a thickness having a predetermined variation in profile across said surface of said substrate wherein the stoichiometric composition of said layer varies in a predetermined periodic and continuous pattern as a function of said thickness to produce successive gradations in the index of refraction of said layer in said predetermined pattern.

21. A process for depositing on the surface of a substrate a layer of a chosen substance comprising a composite of first and second chosen materials, in which the index of refraction of said layer varies in a predetermined continuous and periodic pattern as a function of the thickness of said layer, comprising the steps of:

(a) providing said substrate;

(b) providing first and second selected vapor phase reactants which react upon inducement by radiation of a selected wavelength to form said first chosen material which deposits on said substrate;

(c) providing a third selected vapor phase reactant which reacts with said first selected vapor phase reactant upon inducement by radiation of said selected wavelength to form said second chosen material which deposits on said substrate;

(d) exposing said substrate to said first, second, and third vapor phase reactants in predetermined proportions in the presence of said radiation to deposit said chosen substance having a first predetermined stoichiometric composition and a first predetermined index of refraction;

(e) altering said predetermined proportions of said first, second, and third vapor phase reactants as a function of time in a continuous manner to correspondingly alter in a continuous manner said stoichiometric composition and said index of refraction of said chosen substance deposited as a function of time; and (f) repeating said altering of step "e" for the number of times required to produce said variation of said refractive index in said predetermined continuous and periodic pattern as a function of said thickness of said layer.

22. The process of claim 21 wherein:
(a) said first chosen material is silicon dioxide; and
(b) said second chosen material is silicon nitride.

* * * * *